X 5177C

SEARCH ROO

MINE COMMUNICATION SYSTEM

Filed May 10, 1946

INVENTOR
JAMES A. McNIVEN

BY M. R. Marsh

ATTORNEY

SEARCH ROOM

Patented Feb. 28, 1950 2,499,195

UNITED STATES PATENT OFFICE 2,499,195

MINE COMMUNICATION SYSTEM

James A. McNiven, New York, N. Y.

Application May 10, 1946, Serial No. 668,740

1 Claim. (Cl. 250—4)

The present invention relates primarily to communication systems, and more particularly to a communication system and apparatus for use in mines whereby individuals, such as the miners, within a mine may communicate with others located on the surface of the mine, or whereby the miners in one section or part of a mine may communicate with those located in different parts of a mine In accordance with the invention, communication is established in the above instances through the medium of a resistive network formed by the earth's strata, which eliminates the necessity of wires.

Emergencies often arise in mines such as, for example, coal mines, where a miner or a group of miners may be cut off from the rest of the mine and from the surface by a blocked tunnel. These emergencies may occur as a result of a cave-in, landslide, explosion, fire, and so forth, and in such cases the normal means of communication, which may consist of a telephone circuit, is disabled and put out of service.

When a disaster occurs in a mine, the rescue work can be greatly facilitated if communication can be established between entombed miners and the rescue workers, since the most direct tunnel, or one through which the rescue workers would normally attempt to reach the entombed miners, may be blocked to a considerably greater extent than another tunnel.

In view of the above, it is one of the primary objects of the present invention to provide a communication system for use in mines which utilizes the earth's strata as a conducting medium.

In this connection a more specific object of the invention is to provide a transmitter-receiver unit which may be readily transported by the miners working within the mine, and in the event of a disaster be readily available for the establishment of communication with the surface of a mine or with other miners.

A feature of the invention resides in the provision of an arrangement whereby the transmitter-receiver carried by the miner may be powered from the regular type of battery carried by the miner which is normally used for furnishing power for the miner's lamp, or a handcranked generator, or both.

There are normally a tremendous number of electrical disturbances, such as those caused by static, D. C. machines, and so forth, within a mine, and these disturbances would preclude the employment of an amplitude modulated system. To eliminate the effect of these disturbances in a ground conduction communication system, the present invention contemplates the employment of frequency modulation.

Figure 1:
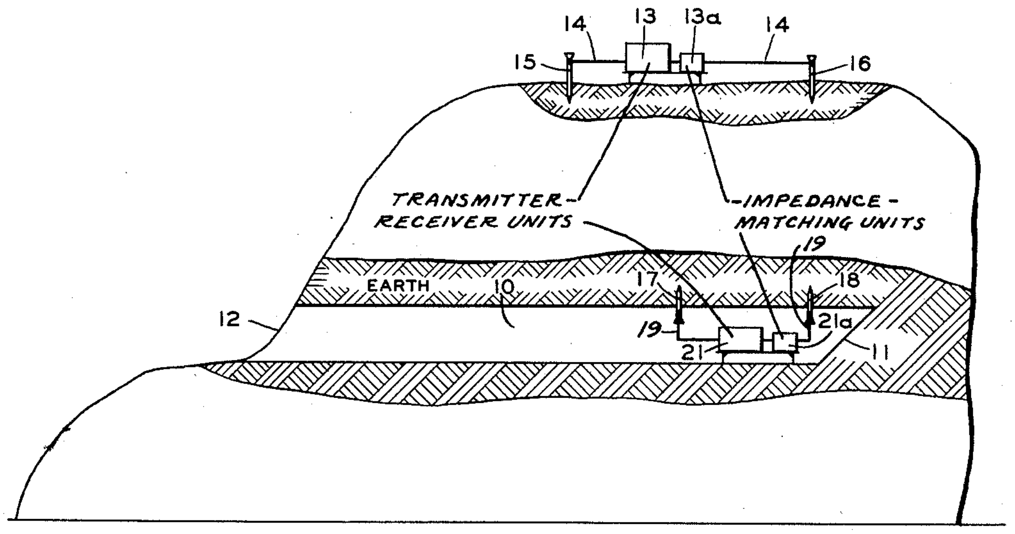
Figure 2:
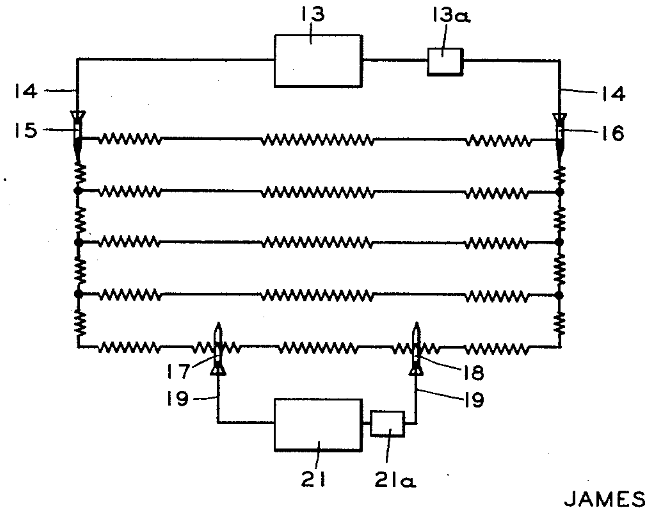

The above and further features and objects of the invention will be more apparent in the following detailed description of a preferred embodiment thereof, and reference is made to the accompanying drawings, wherein:

Fig. 1 is a diagrammatic representation of a mine within the earth with a communication system of the present invention associated therewith; and Fig. 2 is a diagram used to illustrate the principles of the invention as applied to a mine of the type in Fig. 1.

In a communication system to be operated in accordance with the principles of the present invention, there will be driven into the surface of the ground over the various tunnels and shafts of the mine a series of spaced probes. These probes will be driven into the ground to such a depth as to provide a good ground; for example, the depth may be in the neighborhood of three feet. As will be obvious hereinafter, the probes on the surface may more or less be located in accordance with the general plan of the tunnels of the mine but there is no necessity that they follow the plan of the tunnels. However, it has been found that with probes so located as to provide a spacing of approximately twelve hundred feet between any two it may be desired to employ at any time, satisfactory results are produced.

The manner of practicing the present invention and the principles of operation thereof will be more fully set forth in the following detailed description of a preferred embodiment thereof.

Referring to Fig. 1, which illustrates diagrammatically the application of the invention, it will be noted that the mine tunnel, represented in general by the reference numeral 10, is substantially horizontal and enters the earth from the side of a hill. Such mines are sometimes called and known as "side hill" mines, and although the invention is shown and described as applied to such types of mines, it will be apparent hereinafter that the invention is in no manner limited in application to such types of mines as the principles of the invention can equally well be applied to practically all types of mines. For example, the invention may be applied to those mines wherein entrance is through one or more vertical shafts which have working tunnels extending horizontally therefrom at various levels.

For the purpose of illustration it will be assumed that the tunnel 10 extends to a working face 11 and that somewhere between the face and the entrance 12 to the tunnel a cave-in occurs to block the tunnel and thereby entomb the miners at the face 11. If the cave-in is extensive and blocks a considerable part of the tunnel 10, it is likely that the entombed miners may be more easily and quickly reached by a cut from a parallel tunnel either above or below, or to the side of the tunnel wherein the cave-in has occurred, than would be the case if the entire cave-in was removed. In this respect it is obvious that the extent of the cave-in can only be determined with any degree of accuracy by communicating with the entombed miners.

In the event of a disaster such as a cave-in resulting in the entombing of miners in a section of a tunnel such as at the working face 11, a transmitter-receiver unit 13 is connected by conductors 14 to a pair of probes such as 15 and 16 located as near as possible to the working face 11. As shown in Fig. 1, these probes 15 and 16 are located on the surface but it will be obvious that such probes could be located in a tunnel adjacent to or paralleling the tunnel in which the entombed miners are located as a result of the cave-in between the working face and the entrance thereto.

The probes such as 15 and 16 may be located at the time it is desired to communicate with the entombed miners or such probes may be installed from time to time as the working face of the tunnel advances. In accordance with the principles of the invention, the distance between the probes such as 15 and 16, while not being in any manner critical, may be in the neighborhood of a multiple of five to seven times the distance through the earth that it is desired to communicate. For example, if the mine tunnel 10 at the working face 11 is approximately two hundred feet below the surface of the earth, the probes 15 and 16 on the surface may be located approximately twelve hundred feet apart. To increase the efficiency of the transmitter-receiver unit 13 a variable impedance matching unit 13*a* should be employed to enable the matching of the ground or earth impedance to the unit 13.

Within the mine the entombed miners drive a pair of probes such as 17 and 18 into the earth at some convenient location such as in the roof of the tunnel, and connect to these two probes by means of conductors such as 19 of a transmitter-receiver unit 21. The probes such as 17 and 18 may be driven as the tunnel progresses or they may be installed at the time of the disaster. The probes 17 and 18 should form a good contact and establish a good ground, and should be separated an appreciable distance which may under the circumstances above described be in the neighborhood of twelve feet. As in connection with the surface unit, an impedance matching unit 21*a* should be employed with the transmitter-receiver unit 21 in the mine.

It will be apparent that in the event of a disaster within a mine, it is likely that there will be no power available from the outside for the entombed miners, and accordingly their send and receive unit 21 must be designed to be powered from the battery the miners carry for illuminating the miners' lamps, or from some other means such as a hand-cranked generator. In any event the power available is likely to be limited. On the surface of the earth the power supply could be unlimited and the send-receive unit 13 may be extremely powerful and have an output in the neighborhood of 200 watts, and be extremely sensitive (one-tenth of a microvolt sensitivity) so as to be able to pick up signals transmitted from the unit 21 within the mine.

In accordance with the invention it is necessary that frequency modulated signals having a carrier frequency within the range of 80–150 kc. be employed to give the desired results.

The earth strata forms a resistive network (the reactive impedances being negligible in band 80 to 150 kc.) as shown in the diagrammatic illustration of Fig. 2, and signals impressed on the probes 15 and 16 are conducted through the earth, with the resistance between the tunnel and surface somewhat similar to that illustrated. Accordingly, with the signals propagated through the earth in such a manner, the probes 17 and 18 spaced apart and within the propagation area of these signals will pick up some portion of the signal impressed upon the surface probes 15 and 16. While the signal strength may be very weak, in the nature of a few microvolts, it can be amplified to the desired degree to enable communication from the surface to the mine.

In a similar manner signals impressed upon the probes 17 and 18 from the unit 21 will be propagated through the earth and the unit 13 will detect and amplify the signal voltage resulting across probes 15 and 16.

The foregoing detailed description of a system embodying the invention is merely for the purpose of explaining the invention. The system shown and described above may be modified in various ways without departing from the spirit and scope of the invention defined in the appended claim.

What is claimed is:

In a two-way communication system of the type described for communicating through the earth's strata, two pairs of spaced-apart probes in the earth, an electrical signal generating means, means for generating a carrier which is frequency modulated with the signals from said signal generating means within a range wherein the earth's strata contiguous to and between said probes forms a resistive network of negligible reactive impedance, means for impressing upon the first pair of probes said frequency modulated carrier, a variable impedance matching unit connected between said carrier generating means and said first pair of probes for matching the impedance of the earth between said first pair of probes to that of said carrier generating means, a signal receiver including a variable matching impedance associated with a second pair of spaced-apart probes within the area of said resistive network, means including said other pair of probes for detecting signals impressed on said first pair, and means for similarly impressing similar type signals on said second pair of probes and detecting such signals by said first pair of probes.

JAMES A. McNIVEN.

REFERENCES CITED

The following references are of record in the file of this patent:

UNITED STATES PATENTS

| Number | Name | Date |
|---|---|---|
| 996,092 | Johnson | June 27, 1911 |
| 1,333,095 | Roe | Mar. 9, 1920 |
| 1,826,961 | Slichter | Oct. 13, 1931 |
| 1,938,535 | Peters | Dec. 5, 1933 |
| 2,225,668 | Subkow et al. | Dec. 24, 1940 |
| 2,389,432 | Hansell | Nov. 20, 1945 |
| 2,424,274 | Hansell | July 22, 1947 |